(12) United States Patent
Gollakota et al.

(10) Patent No.: US 8,983,011 B2
(45) Date of Patent: Mar. 17, 2015

(54) CROSS TECHNOLOGY INTERFERENCE CANCELLATION

(75) Inventors: Shyamnath Gollakota, Cambridge, MA (US); Fadel Adib, Cambridge, MA (US); Dina Katabi, Cambridge, MA (US); Srinivasan Seshan, Pittsburgh, PA (US)

(73) Assignees: Massachusetts Institute of Technology, Cambridge, MA (US); Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 13/562,872

(22) Filed: Jul. 31, 2012

(65) Prior Publication Data

US 2013/0028305 A1  Jan. 31, 2013

Related U.S. Application Data

(60) Provisional application No. 61/513,641, filed on Jul. 31, 2011.

(51) Int. Cl.
| H04B 7/10 | (2006.01) |
| H04B 7/08 | (2006.01) |
| H04J 11/00 | (2006.01) |

(52) U.S. Cl.
CPC .......... H04B 7/0848 (2013.01); H04J 11/0023 (2013.01)
USPC ........... 375/347; 375/295; 375/316; 375/340; 375/345; 375/346

(58) Field of Classification Search
CPC .... H04B 7/0452; H04B 7/0456; H04B 7/026; H04B 7/0417; H04B 7/0854; H04B 7/086; H04B 1/71052; H04B 1/7107; H04B 7/0669; H04B 7/0845; H04B 7/0413; H04B 7/0426; H04B 7/0465; H04B 7/0478

USPC ......... 375/295, 260, 316, 318, 324, 328, 330, 375/332, 335, 336, 340, 343, 345–347, 348, 375/350

See application file for complete search history.

(56) References Cited

U.S. PATENT DOCUMENTS

| 8,150,345 B2* | 4/2012 | Roy et al. ...................... 455/135 |
| 8,290,443 B2* | 10/2012 | Stirling-Gallacher et al. .......................... 455/67.13 |

(Continued)

FOREIGN PATENT DOCUMENTS

| WO | 2006/124810 | 11/2006 |
| WO | WO 2006/124810 | 11/2006 |

(Continued)

OTHER PUBLICATIONS

International Search Report for PCT Application PCT/US2012/048982, mailed Mar. 13, 2013 (6 pages).

(Continued)

*Primary Examiner* — Hirdepal Singh
(74) *Attorney, Agent, or Firm* — Occhiuti & Rohlicek LLP

(57) ABSTRACT

In one aspect, a method for mitigating an effect of an interfering radio signal at a multiple antenna receiver includes forming an estimate of a relationship of the interfering signal among signals received from the multiple antennas. In general, the interfering signal does not share the same communication technology as a desired signal. The signals received from the multiple antennas filtered and combined according to the estimate of the relationship of the interfering channels to reduce an effect of the interfering signal. Desired data present in the desired signal represented in the filtered and combined signals is decoded and the estimate of the relationship of the interfering signals is updated according to the decoding of the desired signal.

23 Claims, 2 Drawing Sheets

(56) References Cited

U.S. PATENT DOCUMENTS

| | | | |
|---|---|---|---|
| 8,428,524 B2* | 4/2013 | Kim et al. | 455/103 |
| 8,792,444 B2* | 7/2014 | Ishida et al. | 370/329 |
| 8,797,970 B2* | 8/2014 | Xing et al. | 370/329 |
| 2005/0195914 A1* | 9/2005 | Kim et al. | 375/267 |
| 2008/0031309 A1 | 2/2008 | Chang et al. | |
| 2008/0075158 A1* | 3/2008 | Li | 375/232 |
| 2008/0181174 A1* | 7/2008 | Cho | 370/329 |
| 2008/0227422 A1* | 9/2008 | Hwang et al. | 455/278.1 |
| 2009/0122773 A1 | 5/2009 | Gogic | |
| 2010/0172421 A1 | 7/2010 | Okamura et al. | |
| 2011/0065408 A1* | 3/2011 | Kenington et al. | 455/303 |
| 2012/0008599 A1 | 1/2012 | Marin et al. | |
| 2013/0102256 A1* | 4/2013 | Cendrillon et al. | 455/63.4 |
| 2013/0114468 A1 | 5/2013 | Hui et al. | |
| 2013/0301487 A1* | 11/2013 | Khandani | 370/278 |
| 2014/0016716 A1* | 1/2014 | Hum et al. | 375/267 |
| 2014/0056205 A1 | 2/2014 | Aboul-Magd et al. | |

FOREIGN PATENT DOCUMENTS

| | | | |
|---|---|---|---|
| WO | WO 2008/069467 | 6/2008 | |
| WO | WO 2008069467 A1 * | 6/2008 | H04L 1/00 |
| WO | 2010/041236 | 4/2010 | |
| WO | WO 2010/041236 | 4/2010 | |
| WO | 2011/115703 | 9/2011 | |

OTHER PUBLICATIONS

Barriac et al., "Distributed Beamforming for Information Transfer in Sensor Networks," IPSN'04, Apr. 26-27, 2004 (entire document, 8 pages).

Berger et al., "A Coherent Amplify-and-Forward Relaying Demonstrator Without Global Phase Reference," IEEE 19th International Symposium on Personal, Indoor and Mobile Radio Communications, 2005, pp. 1-5 XP031371267.

Berger et al., Carrier Phase Synchronization of Multiple Distributed Nodes in a Wireless Network,: IEEE 8th Workshop on Signal Processing Advances in Wireless Communications, 2007, pp. 1-5 XP031189422.

Brown, III et al., "A Method for Carrier Frequency and Phase Synchronization of Two Autonomous Cooperative Transmitters," 2005 IEEE 6th Workshop on Signal Processing Advances in Wireless Communications, pp. 260-264 (2005).

Ng et al., "Linear Precoding in Cooperative MIMO Cellular Networks with Limited Coordination Clusters," IEEE Journal on Selected Areas in Communications, 28(9): 1446-1545 (2010).

Rahul et al., "A Distributed Wireless Architecture for Exploiting Sender Diversity," ACM SIGCOMM, Aug. 2010 (entire document, 12 pages).

Tolli et al., "Decentralized Minimum Power Multi-Cell Beamforming with Limited Backhaul Signaling," IEEE Transaction on Wireless Communication, 10 (2): 570-580 (2011).

Tu et al., "Coherent Cooperative Transmission from Multiple Adjacent Antennas to a Distant Stationary Antenna through AWGN Channels," IEEE 5th Vehicular Technology Conference, 2002, col. 1, pp. 130-134, XP001210362.

Yang et al., "Some Phase Synchronization Algorithms for Coherent MIMO Radar," IEEE 4th Annual Conference on Information Sciences and Systems, 2011, pp. 1-6, XP031866416.

* cited by examiner

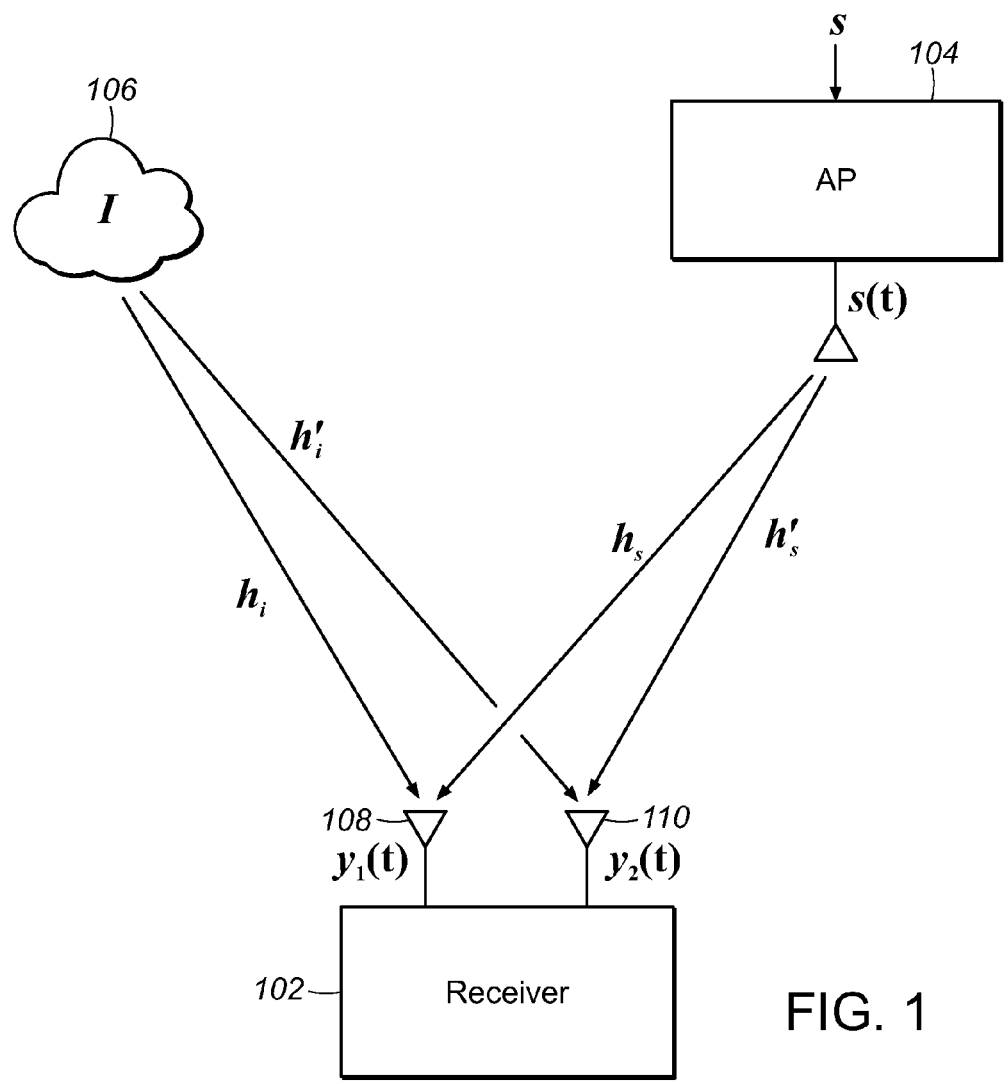
FIG. 1
FIG. 2
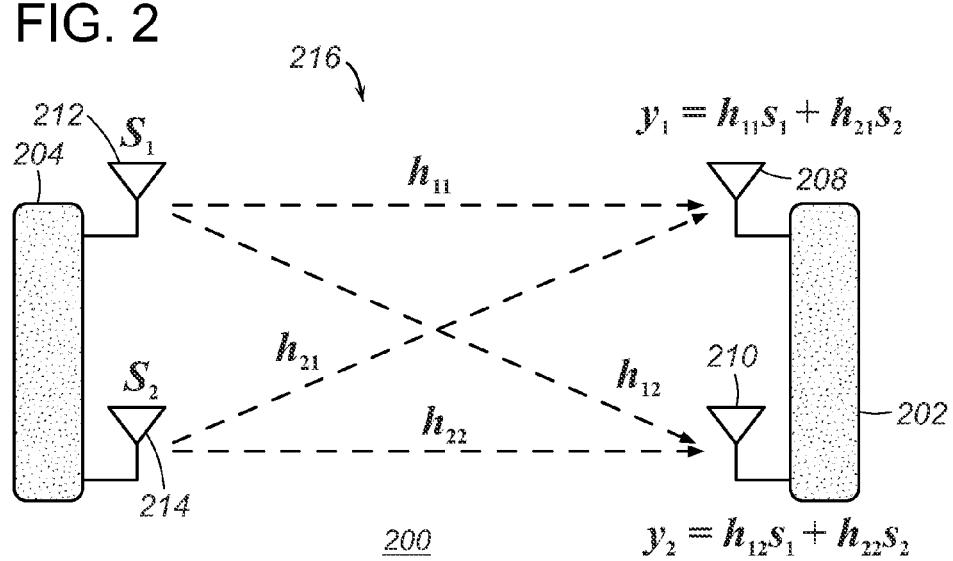

CROSS TECHNOLOGY INTERFERENCE CANCELLATION

CROSS-REFERENCE TO RELATED APPLICATIONS

This application claims the benefit of U.S. Provisional Application No. 61/513,641, filed on Jul. 31, 2011, which is incorporated herein by reference.

STATEMENT AS TO FEDERALLY SPONSORED RESEARCH

This invention was made with Government support under Grant Nos. CNS0721857 and CNS0831660 awarded by the National Science Foundation. The Government has certain rights in this invention.

BACKGROUND

Cross-technology interference is emerging as a major problem for 802.11 networks. Independent studies show that high-power interferers like baby monitors and cordless phones can cause 802.11n networks to experience a complete loss of connectivity, and that such interferers are responsible for more than half of the problems reported in customer networks. Today's high-power non-WiFi sources in the ISM band include surveillance cameras, baby monitors, microwave ovens, digital and analog cordless phones, and outdoor microwave links. Some of these technologies transmit in a frequency band as wide as 802.11, and all of them emit power that is comparable or higher than 802.11 devices. Further, the number and diversity of such interferers is likely to increase over time due to the proliferation of new technologies in the ISM band.

Empirical studies of cross-technology interference show the following:

High-power cross-technology interference can completely throttle 802.11n. Furthermore, loss of connectivity can occur even when the interferer is in a non-line-of-sight position and separated by 90 feet.

While 802.11 and low-power interferers (e.g., Bluetooth) have managed a form of coexistence where both devices stay operational, coexistence with high-power devices (e.g., cordless phones, baby monitors, microwave, etc.) is lacking. Furthermore, the typical outcome of the interaction between 802.11n and a high-power interferer is that 802.11n either suffers a complete loss of connectivity or a significant throughput reduction. Even if carrier sense is deactivated, 802.11n continues to lose connectivity for many of the interferer's locations.

Frequency isolation is increasingly difficult. Multiple of the studied interferers occupy relatively wideband channels of 16-25 MHz (e.g., camera and microwave). Moreover, these devices can occupy any band in the 802.11 spectrum. For example, both the cordless phone and the baby monitor have multiple channels that together cover almost the whole frequency range of 802.11.

Finally, the characteristics of an interferer may change in time and frequency. The interferer may have ON-OFF periods, may move from one frequency to another, or change the width of the channel it occupies, like a microwave. This emphasizes the need for an agile solution that can quickly adapt to changes in the interference signal.

Wireless interference has been the topic of much recent research. Work in this area falls under two broad categories:

A first category addresses interference across technologies. One can identify three main approaches within this category. The first approach attempts to eliminate interference by isolating the signals in time, frequency or space. The most common isolation approach is to employ frequency-based isolation, such as OFDM subcarrier suppression [16, 11, 14], variable channel width [4], or other fine grained frequency fragmentation techniques [19, 12, 10]. Directional antennas may also be used to provide spatial isolation and reduce interference. However, directional antennas are difficult to use in indoor scenarios where the signal tends to bounce off walls and furniture and scatter around [18].

The second approach uses mitigation schemes to modify transmissions to be more resilient to interference (e.g. by using coding or by lowering the bit rates). Mitigation proposals like PPR [8] and MIXIT [9], though designed and evaluated for the same technology, can work across technologies. These schemes however assume interference is fairly transient and limited to some bytes in each packet.

Finally, some proposals identify the type of interference (e.g., is the interference from ZigBee or Bluetooth?) and inform the user so they may switch off the interfering device [2]. Others leverage the specific characteristic of a particular technology to design a suitable coexistence strategy [5].

A second category addresses interference from the same technology. Recent work in this category include interference cancellation [13], ZigZag [6] and analog network coding [15] which address the problem of interference from other 802.11 nodes. Prior work on MIMO systems enables multiple transmitters to transmit concurrently without interference. This includes schemes like SAM [17], Interference Alignment and Cancellation [7], and beamforming systems [3].

Finally prior work on interference management in cellular networks uses multiple antennas to mitigate interference from nodes operating in adjacent cells [18, 1].

REFERENCES CITED ABOVE INCLUDE

[1] ArrayComm. www.arraycomm.com.
[2] Cisco CleanAir Technology, Cisco. www.cisco.com/en/US/netsol/ns1070/index.html.
[3] Aryafar, Ehsan and Anand, Narendra and Salonidis, Theodoros and Knightly, Edward W. Design and Experimental Evaluation of Multi-user Beamforming in Wireless LANs. *Proc. ACM MobiCom*, 2010.
[4] Chandra, Ranveer and Mahajan, Ratul and Moscibroda, Thomas and Raghavendra, Ramya and Bahl, Paramvir. A Case for Adapting Channel Width in Wireless Networks. *Proc. ACM SIGCOMM*, 2008.
[5] Taher, T. M. and Misurac, M. J. and LoCicero, J. L. and Ucci, D. R. Microwave Oven Signal Modelling. *Proc. IEEE WCNC*, 2008.
[6] Gollakota, Shyamnath and Katabi, Dina. Zigzag Decoding: Combating Hidden Terminals in Wireless Networks. *Proc. ACM SIGCOMM*, 2008.
[7] Gollakota, Shyamnath and Perli, Samuel David and Katabi, Dina. Interference Alignment and Cancellation. *Proc. ACM SIGCOMM*, 2009.
[8] Jamieson, Kyle and Balakrishnan, Hari. PPR: Partial Packet Recovery for Wireless Networks. *Proc. ACM SIGCOMM*, 2007.
[9] Katti, Sachin and Katabi, Dina and Balakrishnan, Hari and Medard, Muriel. Symbol-Level Network Coding for Wireless Mesh Networks. *Proc. ACM SIGCOMM*, 2008.

[10] Moscibroda, T. and Chandra, R. and Yunnan Wu and Sengupta, S. and Bahl, P. and Yuan Yuan. Load-Aware Spectrum Distribution in Wireless LANs. *Proc. IEEE ICNP,* 2008.
[11] Rahul, Hariharan and Kushman, Nate and Katabi, Dina and Sodini, Charles and Edalat, Farinaz. Learning to Share: Narrowband-Friendly Wideband Networks. *Proc. ACM SIGCOMM,* 2008.
[12] Lili Cao and Lei Yang and Haitao Zheng. The Impact of Frequency-Agility on Dynamic Spectrum Sharing. *Proc. IEEE DySPAN,* 2010.
[13] Daniel Halperin and Josephine Ammer and Thomas Anderson and David Wetherall. Interference Cancellation: Better Receivers for a New Wireless MAC. *Proc. ACM HotNets,* 2007.
[14] He, Yong and Fang, Ji and Zhang, Jiansong and Shen, Haichen and Tan, Kun and Zhang, Yongguang. MPAP: Virtualization Architecture for Heterogenous Wireless APs. *Proc. ACM SIGCOMM,* 2010.
[15] Katti, Sachin and Gollakota, Shyamnath and Katabi, Dina. Embracing Wireless Interference: Analog Network Coding. *Proc. ACM SIGCOMM,* 2007.
[16] Mishra, S. M. and Brodersen, R. W. and Brink, S. T. and Mahadevappa, R. Detect and Avoid: An Ultra-Wideband/WiMAX Coexistence Mechanism. *IEEE Communications Magazine,* 2007.
[17] Tan, Kun and Liu, He and Fang, Ji and Wang, Wei and Zhang, Jiansong and Chen, Mi and Voelker, Geoffrey M. SAM: Enabling Practical Spatial Multiple Access in Wireless LAN. *Proc. ACM MobiCom,* 2009.
[18] D. Tse and P. Vishwanath. *Fundamentals of Wireless Communications*. Cambridge University Press, 2005.
[19] Yang, Lei and Hou, Wei and Cao, Lili and Zhao, Ben Y. and Zheng, Haitao. Supporting Demanding Wireless Applications with Frequency-Agile Radios. Proc. *USENIX NSDI,* 2010.

SUMMARY

In an aspect, in general, a method for mitigating an effect of an interfering radio signal at a multiple antenna receiver includes forming an estimate of a relationship of the interfering signal among signals received from the multiple antennas, filtering and combining the signals received from the multiple antennas according to the estimate of the relationship of the interfering channels to reduce an effect of the interfering signal, decoding desired data present in a desired signal represented in the filtered and combined signals, and updating the estimate of the relationship of the interfering signals according to the decoding of the desired signal.

Aspects may include one or more of the following features.

Forming the estimate of the relationship of the interfering signal may include forming an estimate of a time domain filter. Forming the estimate of the time domain filter may include forming an estimate of the filter at each of a plurality of transmission frequencies, and forming the time domain filter according to the estimates at said frequencies. The desired signal may include an orthogonal frequency division multiplexed (OFDM) signal, and the transmission frequencies may include frequencies of the OFDM signal. Forming the estimate at each of the transmission frequencies may include using channel estimates from a transmitter of the desired signal to the receiver.

Forming the relationship of the interfering signals may include using a relationship of the desired signal among the signals received from the multiple antennas. The relationship of the desired signal may include channel estimates from a transmitter of the desired signal to the antennas of the receiver. The receiver may include a two-antenna receiver, and filtering and combining the signals may include time domain filtering a signal received from one of antennas of the receiver and forming a difference of the filtered signal and a signal received from the other of the two antennas of the receiver.

Decoding the desired data may include error correcting the desired data and updating the estimate of the relationship of the interfering signals may include using the decoded signal and a relationship of the desired signal among the signals received from the multiple antennas. The method may include storing the signals received from the multiple antennas including iterating the steps of decoding the desired data, including error correcting the desired data, updating the estimate of the relationship of the interfering signals using the error corrected data and a relationship of the desired signal among the signals received from the multiple antennas, and filtering and combining the stored signals received from the multiple antennas.

In another aspect, in general, a method for receiving a desired signal in the presence of an unknown interfering signal includes receiving a first signal at a first antenna, the first signal including a first linear combination of the desired signal and the unknown interfering signal, receiving a second signal at a second antenna, the second signal including a second linear combination of the desired signal and the unknown interfering signal, generating an initial estimate of a plurality of interferer channel ratios each representing a ratio of a first channel characteristic between a source of the interfering signal and the first antenna to a second channel characteristic between the source of the interfering signal and the second antenna at one of a plurality of signal frequencies, and iteratively determining the desired signal from the first signal and the second signal. Iteratively determining the desired signal from the first signal and the second signal includes generating a time domain filter from the interferer channel ratios, filtering the second signal using the time domain filter, generating a filtered second signal, subtracting the filtered second signal from the first signal, yielding an estimate of the desired signal, decoding the estimate of the desired signal, and updating the interferer channel ratios using the decoded estimate of the desired signal.

In another aspect, in general, a method for mitigating an interference effect of signal transmitted from a multiple antenna transceiver at another station includes detecting bidirectional communication between two other stations including determining a first relationship between signals received from one of the other stations at antennas of the transceiver and in a time interval that one other station is receiving a transmission of the bidirectional communication, forming signals for transmission from the antennas of the transceiver according to a second relationship determined from the first relationship, and transmitting said signals from the transceiver.

Aspects may include one or more of the following features.

The method may include determining the second relationship from the first relationship according to a reciprocity relationship. The detected bidirectional communication may use a different communication technology than the signals transmitted from the transceiver.

In another aspect, in general, a multi-antenna communication station is configured to perform all the steps of any method identified above.

In another aspect, in general, software stored on a computer-readable medium includes instructions for causing a processor to perform all the steps of any method described above.

In another aspect, in general, software stored on a computer-readable medium includes instructions for causing a data processing system to form an estimate of a relationship of the interfering signal among signals received from the multiple antennas, filter and combine the signals received from the multiple antennas according to the estimate of the relationship of the interfering channels to reduce an effect of the interfering signal, decode desired data present in a desired signal represented in the filtered and combined signals, and update the estimate of the relationship of the interfering signals according to the decoding of the desired signal.

Aspects may include one or more of the following features.

The instructions for causing the data processing system to form the estimate of the relationship of the interfering signal may include instructions for causing a data processing system to form an estimate of a time domain filter. The instructions for causing the data processing system to form the estimate of the time domain filter may include instructions for causing the data processing system to form an estimate of the filter at each of a plurality of transmission frequencies, and instructions for causing the data processing system to form the time domain filter according to the estimates at said frequencies. The desired signal may include an orthogonal frequency division multiplexed (OFDM) signal, and the transmission frequencies may include frequencies of the OFDM signal. The instructions for causing the data processing system to form the estimate at each of the transmission frequencies may include instructions for causing the data processing system to use channel estimates from a transmitter of the desired signal to the receiver.

The instructions for causing the data processing system to form the relationship of the interfering signals may include instructions for causing the data processing system to use a relationship of the desired signal among the signals received from the multiple antennas. The relationship of the desired signal may include channel estimates from a transmitter of the desired signal to the antennas of the receiver. The receiver may include a two-antenna receiver, and the instructions for causing the data processing system to filter and combine the signals may include instructions for causing the data processing system to time domain filter a signal received from one of antennas of the receiver and form a difference of the filtered signal and a signal received from the other of the two antennas of the receiver.

The instructions for causing the data processing system to decode the desired data may include instructions for causing the data processing system to error correct the desired data and the instructions for causing the data processing system to update the estimate of the relationship of the interfering signals may include instructions for causing the data processing system to use the decoded signal and a relationship of the desired signal among the signals received from the multiple antennas.

The software may include instructions for causing the data processing system to store the signals received from the multiple antennas, and instructions for causing the data processing system to iteratively perform the following steps. Decode the desired data, including error correcting the desired data, update the estimate of the relationship of the interfering signals using the error corrected data and a relationship of the desired signal among the signals received from the multiple antennas, and filter and combine the stored signals received from the multiple antennas.

In another aspect, in general, a multi-antenna receiver (e.g., a MIMO receiver) is designed such that it can discriminate a desired signal (e.g., that which is transmitted by an access point) from an unknown interfering signal (e.g., a baby monitor) and thereby mitigate (i.e., cancel or reduce an effect of) the interfering signal. In general, the interfering signal is unknown in the sense that it does not necessarily conform the same protocol as the sender and receiver of the desired signal. For example, a baby monitor may not include a preamble that would be present in a transmission using the same protocol or technology as the desired signal.

In many conventional MIMO systems, if the channel characteristics between antennas in the system are known to a receiver, then the receiver can optimally discriminate between individual transmissions included in the signals received at the receiver's antennas. However, in the presence of an unknown interfering signal, not all channel characteristics can be determined, and in particular, the channel characteristics between the unknown transmitter and the receiver's antennas are not known to the receiver.

In some examples, a multi-antenna receiver is designed such that it can iteratively estimate an interferer channel ratio which is the ratio of the channel characteristics between the receiver's antennas and the interfering transmitter. This ratio can be used to discriminate between the desired signal and the unknown interfering signal.

In some examples, the multi-antenna receiver includes two antennas, each antenna receiving a different combination (i.e., based on different channel characteristics) of the desired signal and the interfering signal. The receiver can estimate the channel characteristics between its antennas and the transmitter of the desired signal (e.g., using transmitted preambles). The receiver can obtain an initial estimate of the interferer channel ratio, for example by averaging over a limited number of OFDM symbols.

The receiver then uses the interferer channel ratio to generate a time domain filter which is applied to the signal received by the first of the two antennas. The filtered output of the time domain filter is subtracted from the signal received by the second antenna, yielding an estimate of the desired signal. The estimate of the desired signal is demodulated and decoded, yielding an estimate of the bits transmitted by the desired signal. The estimate of the transmitted bits is remodulated and used to obtain an updated estimate of the interferer channel ratio. In some examples, this process repeats for a predetermined number of iterations, each iteration improving the estimate of the interferer channel ratio.

Once a satisfactory estimate of the interferer channel ratio is obtained, the desired signal can be sufficiently discriminated from the interfering signal and thus can be successfully decoded.

In another aspect, in general, a multi-antenna transceiver (e.g., a MIMO transceiver) is designed so that it can detect bidirectional communication (e.g., alternating transmissions in each direction) between two other stations, which may share spectrum but may not conform to the same protocol as the receiver. The transceiver determines a first relationship between signals received from one of the other stations at its antennas. In a time interval that one other station is receiving a transmission of the bidirectional communication, the transceiver forms signals to transmit from its antennas according to a second relationship determined from the first relationship (e.g., based on a reciprocity principle) in order to mitigate an interference (e.g., using a nulling or an aligning approach) at the other station from the transmission from its antennas. In some examples of such an approach, the stations conducting the directional communication follow a policy that each transmission from a first station to a second station is immediately preceded by at least a short transmission (e.g., a "clear to send" (CTS) transmission) from the second station during which time the transceiver can determine the relationship of the signal received from the second station at its antennas.

One or more embodiments, have advantages including one or more of the following.

Embodiments tackle scenarios in which the interferer is a single antenna device. This is typically the case for current 802.11 interferers, like baby monitors, microwave ovens, cordless phones, surveillance cameras, etc.

Embodiments tackle applies to scenarios in which the interfering signal lasts more than a few seconds. This constraint does not necessarily mean that the interferer transmits continuously for that duration. For example, a microwave signal that lasts for a few seconds satisfies this constraint despite having OFF periods.

Embodiments tackle applies to scenarios where, in the absence of an interferer, the 802.11n receiver can use MIMO multiplexing, i.e., it can receive multiple concurrent streams at some bitrate. If the 802.11n receiver cannot multiplex streams from the same technology, it cannot be made to multiplex streams from different technologies.

Embodiments tackle can address environments with multiple concurrent interferers, as long as the interferers are in different frequencies (i.e., different 802.11 OFDM subcarriers). This is a common case in today's networks because the presence of multiple high-power interferers in the same band will cause them to interfere with each other, and is likely to prevent the proper operation of the device.

While past work that deals with cross-technology interference typically employs different mechanisms for different technologies, TIMO is technology agnostic and hence its complexity stays constant as the number of technologies in the ISM band increases. Further, the components used in TIMO such as correlation, equalization and projection, are also used in MIMO receivers (though for a different purpose), and hence are amenable to hardware implementations.

In summary, one or more embodiments enable 802.11n to communicate in the presence of high-power cross-technology interference. These embodiments exploit 802.11n's MIMO capability to treat a high-power signal from a different technology as if it were another stream from the same technology, hence enabling diverse technologies to share the same frequency band. The embodied approach provides for a new form of coexistence, in which different technologies do not necessarily have to find unoccupied bands and could, in crowded environments, occupy the same band, thus increasing spectral efficiency.

Other features and advantages of the invention are apparent from the following description, and from the claims.

DRAWINGS

FIG. 1 illustrates two 802.11n nodes communicating in the presence of an interferer.

FIG. 2 illustrates a transmission channel over which two 802.11 nodes communicate.

DESCRIPTION

Figure 3:
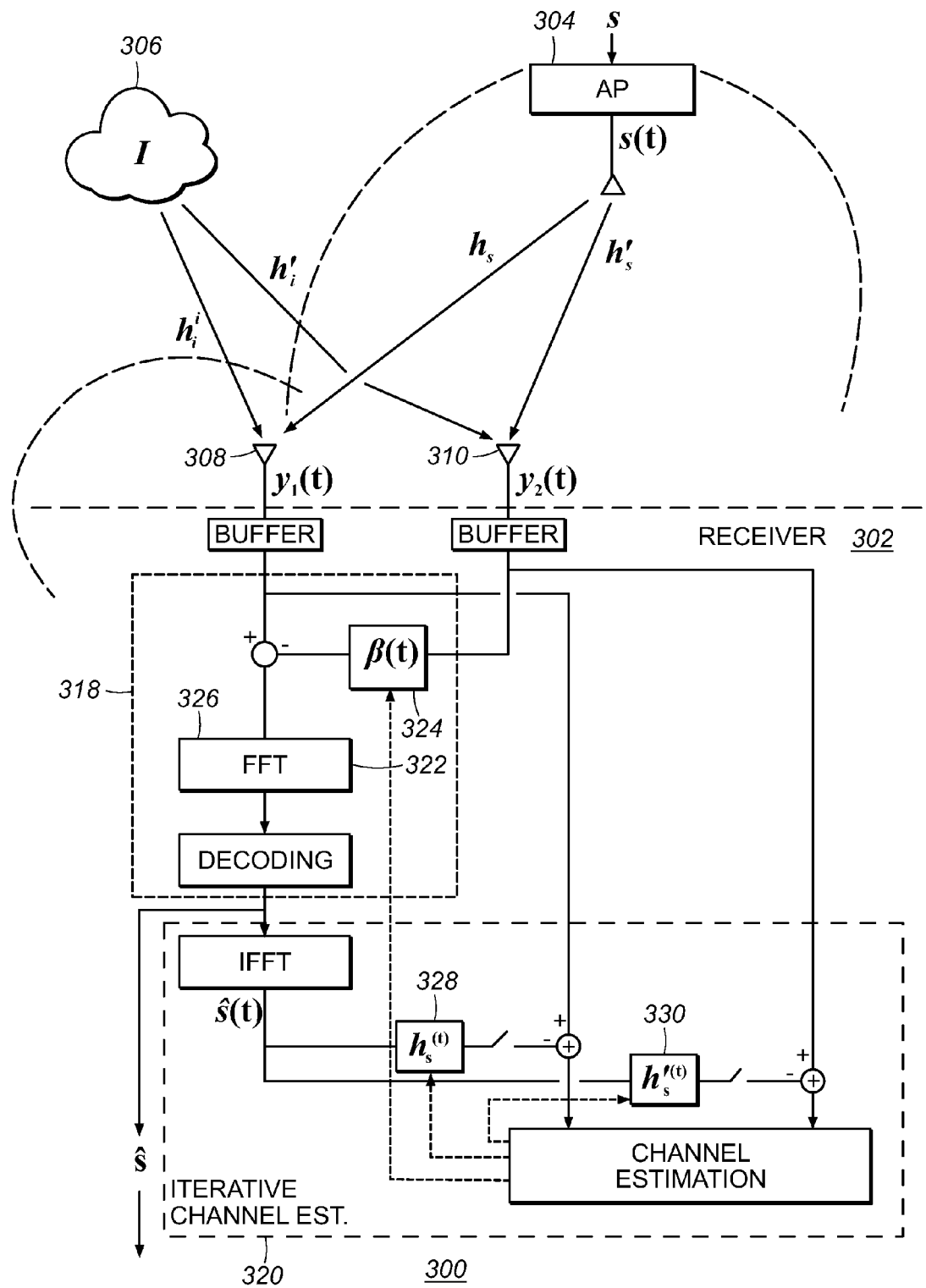
FIG. 3 illustrates two 802.11n nodes communicating in the presence of an interferer, including a detailed block diagram of an 802.11n receiver.

Referring to FIG. 1, a two-antenna 802.11n receiver node 102 is communicating with an 802.11n transmitter node 104 in the presence of a high-power unknown interferer 106. Let s(t) be the signal of interest and i(t) the interference signal. The 802.11n receiver node 102 receives the following signals on its two antennas 108, 110:

$$y_1(t) = h_i i(t) + h_s s(t) \quad (1)$$

$$y_2(t) = h'_i i(t) + h'_s s(t), \quad (2)$$

where $h_i$ and $h'_i$ are the channels from the interferer 106 to the 802.11n receiver 102, and $h_s$ and $h'_s$ are the channels from the 802.11n transmitter 104 to the 802.11n receiver 102. Note that these equations are for single-tap channels. Subsequent sections of this document extend these equations to multi-tap channels. The 802.11n receiver 102 solves these equations to obtain its signal of interest s(t). The receiver 102 knows the received samples, $y_1(t)$ and $y_2(t)$, and the channels from its transmitter 104, $h_s$ and $h'_s$, which can be computed in the presence of interference. In this example, the receiver 102, however, cannot compute the channels from the interferer 106, $h_i$ and $h'_i$, because it does not know the interferer's signal structure or preamble. Hence, it is left with two equations and three unknowns (s(t), $h_i i(t)$, and $h'_i i(t)$), which it cannot solve. Note that i(t) can be lumped with the channel variable because there is no interest in decoding the symbols of the interferer 106.

Note that the receiver 102 can cancel the interference if it knows the interferer's channel ratio $$\frac{h_i}{h'_i}.$$

In particular, the receiver can rewrite equations 1 and 2 to express the signal of interest as:

$$s(t) = \frac{y_1(t) - \beta y_2(t)}{h_s - \beta h'_s} \text{ for } \beta = \frac{h_i}{h'_i}. \quad (3)$$

The only unknown in the above equation is $\beta$. Thus, though the 802.11n receiver 102 cannot compute the exact channels of the interferer 106, it can still cancel its interference using only its channel ratio.

The receiver 102 can obtain the channel ratio as follows: Given a time instance $t=t_0$, the transmitter 104 sends a known symbol $s(t_0)$. The receiver 102 can then substitute in equations 1 and 2 to obtain:

$$\frac{h_i}{h'_i} = \frac{y_1(t_0) - h_s s(t_0)}{y_2(t_0) - h'_s s(t_0)}, \quad (4)$$

where all terms are known except for the ratio $$\frac{h_i}{h'_i}.$$

Below, this idea is further developed to eliminate the need for having the transmitter 104 send a known symbol, which makes the scheme applicable to existing 802.11n frames. The solution is also further generalized to address scenarios in which different frequencies have different interferers, or the interferer hops across frequencies.

Referring to FIG. 2, in another illustrative example, consider a 2×2 MIMO system 200. A transmitter 204 transmits stream $s_1(t)$ on a first antenna 212, and $s_2(t)$ on a second antenna 214. A wireless channel 216 linearly combines the signal samples corresponding to the two streams. Therefore, a receiver 202 receives the following linear combinations on its two antennas (208, 210):

$$y_1(t) = h_{11}s_1(t) + h_{21}s_2(t) \quad (5)$$

$$y_2(t) = h_{12}s_1(t) + h_{22}s_2(t), \quad (6)$$

where $h_{ij}$ is a complex number whose magnitude and angle refer to the attenuation and delay along the path from the $i^{th}$ antenna on the transmitter 204 to the $j^{th}$ antenna on the receiver 202, as shown in FIG. 2. If the receiver 202 knows the channel coefficients, $h_{ij}$, it can solve the above two linear equations to obtain the two unknowns, $s_1(t)$ and $s_2(t)$, and decode the two transmitted streams.

To enable the receiver 202 to estimate the channel coefficients, $h_{ij}$, a MIMO transmitter 204 starts each frame by transmitting a known preamble from each of its antennas (212, 214), one after the other. The receiver 202 uses its knowledge of the transmitted preamble and the received signal samples to compute the channel coefficients, which it uses to decode the rest of the bits in the frame.

The above model assumes a narrowband channel, whose bandwidth is limited to a few MHz. In wideband channels, different frequencies may experience different channels. Thus, the channel function cannot be expressed as a single complex number; it has to be expressed as a complex filter, and the multiplication becomes a convolution:

$$y_1(t) = h_{11}*s_1(t) + h_{21}*s_2(t)$$

$$y_2(t) = h_{12}*s_1(t) + h_{22}*s_2(t),$$

Modern wireless technologies like 802.11a/g/n, WiMax, and LTE handle such wide channels by operating on the signal in the frequency domain using OFDM. OFDM divides the channel frequency spectrum into many narrow subbands called OFDM subcarriers. The receiver 202 takes an FFT of the received signal and operates on individual OFDM subcarriers, as if they were narrowband channels, i.e., the receiver applies the model in Equations 5 and 6 to the frequency domain signal, and decodes the transmitted symbols.

In 802.11, there are 64 OFDM subcarriers, four of which are referred to as pilots that have a known symbol pattern to allow the receiver track the channel. Additionally, 48 subcarriers are used to transmit data and the rest are unused for distortion reasons.

Continuing to refer to FIG. 2, in a more detailed illustration of the scenario of FIG. 1, an 802.11n transmitter node 304 is communicating with a two 802.11n receiver node in the presence of high-power cross-technology interference from an interferer 306. Note that the example of FIG. 2 is illustrative in nature and the results can be extended to nodes including any number of antennas.

The signal at the 2-antenna 802.11n receiver 302 is the sum of the signal of interest, s(t), and the interference signal, i(t), after convolving them with their respective channels to the receiver:

$$y_1(t) = h_i * i(t) + h_s * s(t) \quad (7)$$

$$y_2(t) = h'_i * i(t) + h'_s * s(t) \quad (8)$$

where $h_i$ and $h'_i$ are the channel functions of the interference signal, and $h_s$ and $h'_s$ are channel functions of the signal of interest.

Since the signal of interest (i.e., that of 802.11n) is known a-priori to be an OFDM signal, the receiver 302 processes its input in the frequency domain by taking an FFT. Thus, for each OFDM subcarrier, j, the receiver obtains the following equations:

$$Y_{1j} = H_{ij}I_j + H_{sj}S_j \quad (9)$$

$$Y_{2j} = H'_{ij}I_j + H'_{sj}S_j, \quad (10)$$

where the terms in the above equations are frequency domain versions of the terms in Equations 7 and 8, for a particular OFDM subcarrier. Thus, the receiver can express the signal of interest as:

$$S_j = \frac{Y_{1j} - \beta_j Y_{2j}}{H_{sj} - \beta_j H'_{sj}} \text{ for } \beta_j = \frac{H_{ij}}{H'_{ij}}. \quad (11)$$

All terms in Equation 11 are known at the receiver 302, except for $\beta_j$. The objective of the receiver 302 is to determine $\beta_j$ in each subcarrier, and use it to decode the signal of interest, $S_j$, in that subcarrier.

One approach for computing the ratio $$\beta_j = \frac{H_{ij}}{H'_{ij}}$$

is to rely on the signal $S_j$ in the OFDM pilots being known to the receiver. Thus, if one assumes $\beta_j$ is the same for all OFDM subcarriers, one can simply substitute the signal $S_j$, where j is a pilot subcarrier, in Equation 11, and use that equation to compute the ratio $\beta$. The receiver then uses this ratio to compute signal values in other OFDM subcarriers that contain data symbols. However, the assumption that the interferer channel ratio is the same in all OFDM subcarriers is typically invalid for several reasons. First, there might be multiple interferers each of them operating in a different frequency band. For example, the interfering signal may be a combination of two cordless phone signals each occupying upto 4 MHz and overlapping with a different set of 802.11n OFDM subcarriers. Second, there might be an interferer that hops across the OFDM subcarriers, but does not always occupy all subcarriers. This is the case for the narrowband signal during the microwave ON period. Finally, the interferer may have a relatively wideband channel, like the baby monitor which can span upto 16 MHz. In this case, the channel of the interferer may differ across the OFDM subcarriers due to multipath and hence the channel ratio also changes across the subcarriers.

In another approach, the receiver computes the interferer's channel ratio for each OFDM subcarrier independently. Since most OFDM subcarriers carry data and contain no known patterns, the receiver has to compute this ratio without any known symbols.

Equations 9 and 10 can be used to obtain a closed form expression for the interferer's channel ratio in each OFDM subcarrier. To do so, the contribution from the signal of interest $S_j$ is first eliminated by multiplying Equation 10 with $$\frac{H_{sj}}{H'_{sj}}$$

and subtracting it from Equation 9:

$$Y_{1j} - \frac{H_{sj}}{H'_{sj}} Y_{2j} = \left( \frac{H_{ij}}{H'_{ij}} - \frac{H_{sj}}{H'_{sj}} \right) H'_{ij} I_j$$

Next, the resulting equation is multiplied with the conjugate of $Y_{2j}$, and the expectation is taken as follows:

$$E\left[\left(Y_{1j} - \frac{H_{sj}}{H'_{sj}}Y_{2j}\right)Y^*_{2j}\right] = \left(\frac{H_{ij}}{H'_{ij}} - \frac{H_{sj}}{H'_{sj}}\right)E[H'_{ij}I_jY^*_{2j}] \quad (12)$$

$$= \left(\frac{H_{ij}}{H'_{ij}} - \frac{H_{sj}}{H'_{sj}}\right)E[H'_{ij}I_j(H'^*_{ij}I^*_j + H'^*_{sj}S^*_j)]$$

$$= \left(\frac{H_{ij}}{H'_{ij}} - \frac{H_{sj}}{H'_{sj}}\right)\left(\begin{array}{c}E[|H'_{ij}I_j|^2] + \\ H'^*_{sj}H'_{ij}E[I_jS^*_j]\end{array}\right)$$

$$= \left(\frac{H_{ij}}{H'_{ij}} - \frac{H_{sj}}{H'_{sj}}\right)E[|H'_{ij}I_j|^2]$$

$$= \left(\beta_j - \frac{H_{sj}}{H'_{sj}}\right)P'_{Ij},$$

where $|x|^2=xx^*$ denotes the square of the amplitude of the complex number x, and $E[I_jS_j]=0$ because the signal of interest is independent from the interference signal and hence their correlation is zero. Also $P'_{Ij}=E[|H'_{ij}I_j|^2]$ is the received interference power in OFDM subcarrier j on the second antenna of the 802.11n receiver.

Equation 12 has two unknowns $\beta_j$ and $P'_{Ij}$. Thus, if the receiver knows the interferer's received power, $P'_{Ij}$, it can solve Equation 12 to obtain the desired ratio. To compute $P'_{Ij}$, the receiver takes Equation 10, multiplies it by its conjugate, and then computes the expectation as follows:

$$E[Y_{2j}Y^*_{2j}] = E[(H'_{ij}I_j + H'_sS_j)(H'_{ij}I_j + H'_sS_j)^*] \quad (13)$$

$$= E[|H'_{ij}I_j|^2] + E[|H'_sS_j|^2]$$

$$= P'_{Ij} + P'_{Sj},$$

where $P'_{Sj}$ is the power of the signal of interest on the second antenna in the $j^{th}$ OFDM subcarrier. Again, to reach Equation 13 the fact that the interference signal and the signal of interest are independent of each other is exploited.

Equation 12 and Equation 13 can be solved together to obtain the ratio:

$$\beta_j = \frac{H_{ij}}{H'_{ij}} = \frac{E\left[\left(Y_{1j} - \frac{H_{sj}}{H'_{sj}}Y_{2j}\right)Y^*_{2j}\right]}{E[|Y_{2j}|^2] - P'_{Sj}} + \frac{H_{sj}}{H'_{sj}}. \quad (14)$$

This equation enables the 802.11 receiver to compute the interferer's channel ratio without any known symbols, simply by substituting the power and the channel ratio for s(t).

It is important to note that the above derivation exploits that expectations can be computed by taking averages. The accuracy of this estimate increases as one averages over more signal symbols.

Once the 802.11n receiver has an estimate of the interferer's channel ratio, $\beta_j$, in each OFDM subcarrier, it proceeds to decode its own signal of interest. One way to decode would be to substitute $\beta_j$ in Equation 11 to compute $S_j$ in the frequency domain. This approach works well when the interferer is a narrowband signal, like a cordless phone. However, it has low accuracy in scenarios the interferer has a relatively wideband channel, like a baby monitor that spans 16 MHz. This is because wideband signals suffer from multipath effects; i.e., the signal travels from the sender to the receiver along multiple paths with different delays. A wideband receiver receives the combination of multiple copies of the same signal with different relative delays. This leads to inter-symbol interference (ISI), which mathematically is equivalent to convolving the time-domain signal with the channel on the traversed paths.

To deal with ISI, an OFDM transmitter inserts a cyclic prefix between consecutive symbols. The receiver discards the cyclic prefix and takes the remaining signal, thus eliminating any interference from adjacent symbols. This, however, does not work when the interferer is a wideband interferer like the baby monitor. First, its signal may not have a cyclic prefix. Second, even if it does, as noted by past work on concurrent 802.11n transmissions, it is unlikely that the cyclic prefixes of the two devices are synchronized, in which case the receiver cannot discard a single cyclic prefix that eliminates ISI for both the devices.

The above discussion means that in the frequency domain, the interferer's signal, $I_j$, will experience ISI which would add noise. As a result, Equations 9 and 10 have additional noise terms due to ISI. While this is not a problem for the channel ratio estimation since one can average across more samples to obtain an accurate estimate of $\beta_j$; this additional noise would reduce the SNR for the signal of interest and, hence, affect its throughput.

Referring to FIG. 3, one solution to the ISI problem is a system 300 including an 802.11n receiver 302 which includes two main components for computing the interferer's channel ratio in an OFDM subcarrier without knowing the interferer's preamble or signal structure. The first component is a decoder module 318 which is capable of decoding the signal of interest given the interferer's channel ratio in every OFDM subcarrier. The second component is an iterative channel estimation module 320 which iteratively creates the channel estimates which reduce the noise in the computation of channel ratios, hence increasing the signal to noise ratio. The following sections describe these components.

The 802.11n receiver 302 decodes the signal of interest s(t) by eliminating interference in the time domain. Here, ISI is simply a convolution with a filter, which can be removed by applying the inverse filter (i.e., an equalizer). Thus, the initial time domain Equations 7 and 8 which describe the signal at the 802.11n receiver 302 are again considered:

$$y_1(t)=h_i*i(t)+h_s*s(t) \quad (15)$$

$$y_2(t)=h'_i*i(t)+h'_s*s(t) \quad (16)$$

A filter 324 included in the decoder module 318, h, is determined such that:

$$h*h'_i=h_i$$

Given such a filter 324, the decoder module 318 of the receiver 302 can convolve h with Equation 16 and subtract the resulting equation from Equation 15 to eliminate i(t) and obtain an equation in s(t), which it can decode using a standard 802.11 decoder 322.

The above filter can be represented in the frequency domain as:

$$H_jH'_{ij} = H_{ij} \Rightarrow H_j = \frac{H_{ij}}{H'_{ij}} = \beta_j$$

In some examples, the desired filter 324 h is computed by the iterative channel estimation module 320 by taking the IFFT of the interferer channel ratios, $\beta_j$'s.

To summarize, the decoder module 318 of the 802.11n receiver 302 first moves the received signal to the frequency domain (e.g., using FFT module 326) and decodes the frequency domain received signal using a decoder 322. The dedoced frequency domain received signal is passed to the iterative channel estimation module 320 which computes the interferer channel ratios using Equation 14 while averaging over multiple samples to reduce the ISI and noise. The iterative channel estimation module 320 transforms the interferer channel ratio into a time domain filter 324 by taking an IFFT. Finally, the decoder module 318 uses the filter 324 to eliminate interference in the time domain. The decoder module 318 of the receiver 302 can then take the interference-free signal and decode its signal of interest using a standard 802.11 decoder 322.

The approach presented above computes expectations by taking averages over multiple OFDM symbols. A packet, however, may not have enough OFDM symbols to obtain a highly accurate estimate. Also averaging over multiple packets will reduce the system's ability to deal with a dynamic interferer. Thus, an accurate estimate of the interferer's channel ratio, $\beta_j$, is obtained using only a few OFDM symbols.

To increase the accuracy of the estimate without much averaging, the receiver 302 iterates over the following steps:
Initialization: The iterative channel estimation module 320 of the receiver 302 obtains a rough estimate of $\beta_j$ by averaging over a limited number of OFDM symbols.
Step 1: The decoder module 318 of the receiver 302 uses the estimate of $\beta_j$ to obtain the signal, s(t). The decoder module 318 of the receiver 302 then decodes s(t) using the standard decoder 322 to obtain the transmitted bits.
Step 2: The iterative channel estimation module 320 of the receiver 302 re-modulates the decoded bits to obtain an estimate of s(t), referred to as ŝ(t). The iterative channel estimation module 320 convolves ŝ(t) with channel functions 328, 330 and subtracts the results from $y_1(t)$ and $y_2(t)$. Thus, the following is obtained:

$$\hat{y}_1(t) = h_i * i(t) + h_s * (s(t) - \hat{s}(t))$$

$$\hat{y}_2(t) = h'_i * i(t) + h'_s * (s(t) - \hat{s}(t)).$$

The iterative channel estimation module 320 then obtains a new estimate for $\beta_j$ while treating $(s(t)-\hat{s}(t))$ as the new signal of interest.

After iterating between Step 1 and 2 for two or three times, the iterative channel estimation module 320 obtains an accurate estimate of the interferer's channel ratio $\beta_j$, which it passes to the decoder module 318 which uses $\beta_j$ to decode signal s(t).

In each iteration, the signal of interest used in Step 2, $(s(t)-\hat{s}(t))$, has a smaller magnitude. Since, in Step 2, the iterative channel estimation module 320 is focused on estimating the interferer's ratio, the signal of interest plays the role of noise; reducing this signal's magnitude increases the accuracy of the ratio estimate. This higher accuracy in the ratio $\beta_j$ percolates to the estimate of s(t) in Step 1. Consequently, the decoded bits are more accurate and lead to even smaller difference between ŝ(t) and s(t), and hence an even more accurate $\beta_j$.

In the presentation above, it is assumed that the 802.11n receiver knows the channel of the signal of interest, $H_{sj}$ and $H'_{sj}$. There are two cases which must be considered when computing the channel of the signal of interest. First, the signal of interest starts before the interference in which case the receiver 302 can use the 802.11 preamble to compute the channel, as usual. Second, the interference signal starts before the signal of interest. In this case, the receiver 302 can easily compute the interferer's channel ratio $$\beta_j = \frac{H_{ij}}{H'_{ij}}$$

by taking the ratio of the signals it receives on its two antennas 308, 310 $Y_{1j}=H_{ij}I_j$ and $Y_{2j}=H'_{ij}I_j$. Once the receiver 302 knows the interferer's channel ratio, it computes the equalization filter 324 as described above and uses it to eliminate the interference signal. The receiver 302 can then use the 802.11n preamble to compute the channel as usual.

Two points are worth noting: First, while it is easy to compute the interferer's channel ratios when the interferer 306 is alone on the medium, this does not eliminate the need to continue tracking the interferer's channel ratio. In particular, the channel ratio may change as the interferer 306 moves to a different frequency, as in the narrowband phase of a microwave signal, or it might change for a mobile interferer, as with the cordless phone.

Second, the above scheme may miss in scenarios in which the interference and the 802.11n signal starts during the same OFDM symbol. This event has a low probability, and the resulting packet loss is minor in comparison to the packet loss observed without using the system described above. When such an event occurs the packet will be retransmitted by its sender as usual.

In some examples, estimating the interferer's channel ratio, $\beta_j$, using Equation 14 makes use of the 802.11n receiver 302 computing the expectations by taking averages over multiple OFDM symbols. This averaging, however, needs to be done only over symbols that are affected by interference. Thus, the 802.11n receiver 302 needs to determine where, in a packet, interference starts and where it stops. Identifying the sequence of symbols affected by interference follows the principle that when the interference signal starts, it causes a dramatic increase in decoding errors. In some examples, these errors appear at the PHY layer as large differences between the received symbol and the nearest constellation points in the I and Q diagram. Such differences are referred to as soft errors. Thus, for each OFDM subcarrier, the 802.11n receiver 302 computes the soft-error, and normalizes it by the minimum distance of the constellation. When the interferer starts, the soft errors jump; when it ends, they go back to their low values. The implementations described herein consider a jump that is higher than doubling the errors as a potential interferer, i.e., interference above 3 dB. This means that low power interferers may be missed, but such interferers can be dealt with using traditional methods like reducing the bit rate.

In some examples, the receiver 302 first performs packet detection as usual by looking for jumps in received power (e.g., using standard window detection algorithms). Then, the receiver 302 computes the 802.11 preamble cross-correlation, in a manner similar to current 802.11. If the cross-correlation stays low, the receiver 302 works under the assumption that the signal of interest may start later. Hence, it computes the channel ratios for the signal though it is not its signal of interest. On the other hand, if the cross-correlation spikes, the receiver 302 identifies the packet as a signal of interest. It continues decoding the packet using a standard 802.11 decoder 322. If the packet does not pass the checksum test, the receiver computes the soft-errors. If the soft-errors jump by over 3 dB, the receiver initiates the channel ratio estimation algorithm. Specifically, for each OFDM bin, the decoder 322 starts at the symbol where the soft errors jump and proceeds to compute the interference channel ratios in an iterative manner. Once the channel ratios are estimated for each OFDM subcarrier, the receiver uses the decoder 322 to decode its signal of interest.

A MIMO transmitter (e.g., 304) can also encode its signal to prevent interference to a competing transmission from a different technology. Specifically, let i(t) be the competing signal and $s_1(t)$ and $s_2(t)$ the two streams that a 2-antenna 802.11n node 304 transmits. The receiver 302 of the competing signal receives the following:

$$z(t)=h_i i(t)+h_{s1}s_1(t)+h_{s2}s_2(t), \quad (17)$$

where $h_i$ refers to the channel from its transmitter and $h_{s1}$ and $h_{s2}$ are the channels from the 2-antenna 802.11n transmitter 304. The 802.11n transmitter 304 can cancel its signal at the receiver of the competing technology by ensuring that the signals it transmits on its two antennas satisfy $$s_2(t) = -\frac{h_{s1}}{h_{s2}}s_1(t).$$

Such a technique is typically referred to as interference nulling.

It is noted that nulling does not require the knowledge of the exact channels to the receiver. It is sufficient to know the channel ratios to null the signal at some receiver. This is crucial since for cross-technology scenarios, it is hard to estimate the exact channel.

In some examples, if the interfering technology is bi-directional in the frequency of interest, 802.11n nodes can use the interference caused by the receiver's response to compute the channel ratio from the receiver to itself as is described above. The required ratio for nulling, however, refers to the channels in the opposite direction, i.e., from the 802.11n transmitter to the interfering receiver. To deal with this issue, the system exploits that wireless channels exhibit reciprocity, i.e., the channel function in the forward and backward direction is the same. Using reciprocity one can compute the required channel ratio. Once the ratio is computed, the transmitter can perform interference nulling. Since it is difficult to synchronize wideband cross-technology interferers with 802.11, to avoid ISI nulling is performed by using a time-domain equalizer.

Thus, interference nulling combined with the algorithm for estimating the interferer's channel ratio provide a new primitive that enables a MIMO node to transmit in the presence of a different technology without hampering reception of that technology. This primitive, however, requires the competing technology to be bidirectional, i.e., the competing receiver acks the signal or transmits its own messages, like a cordless phone.

If the technology is bidirectional, then the MIMO transmitter can learn the channel ratio to the communicating node pair, using the interference they create. The MIMO transmitter then alternates between nulling its signal at the two communicating nodes. For example, in the case of a cordless phone, the 802.11 transmitter has to switch between nulling its signal at the handset and nulling its signal at the base. In the case of the cordless phone, the switching time is constant, and for the tested phone it is 2.25 ms. Even if the switching time is not constant, as long as the pattern of the interference is persistent (e.g., one data packet, followed by one ack), the MIMO node can monitor the medium and immediately switch every time the medium goes idle.

On the other hand, if the receiver of the competing technology is not bidirectional, an 802.11n device has no way to compute its channel ratio, and hence cannot cancel its signal at the receiver of the competing technology. The impact of such interference will depend on the competing technology. For example, interference does not hamper a microwave oven function. Also, analog devices (e.g., an analog camera) have some level of resistance to interference which causes smooth degradation in their signal, and while they suffer from interference, they can still function if the interferer is not in close proximity.

In general, the objective is to create a form of coexistence between 802.11n and high-power interferers that approaches the coexistence it enjoys with low-power devices like Bluetooth, where the two technologies may interferer if they are in close proximity but the interference is limited and does not cause either device to become completely dysfunctional. Unidirectional devices which do not sense the medium or use any feedback from their receiver tend to show some level of resistance to interference. Hence, even if the 802.11n node did not cancel its interference at their receiver, they can still support some level of coexistence, as long as 802.11n can protect itself from their interference.

In some examples, the approaches described above are generalized to any number of antennas. Let M be the number of antennas at the 802.11 receiver. Say, there are K concurrent 802.11n transmissions, $s_1(t) \ldots s_K(t)$ whose channels are known at the receiver. It is desirable to estimate the interferer's channel in the presence of these K transmissions. Let, $h^k{}_j$ be the channel coefficient of the kth transmission at the jth antenna on the receiver. Similarly, let $h_j$ denote the channel of the interferer to the jth antenna on the receiver.

First, it is noted that one can always set $h_1$ to one. This can be done by considering the interferer to be the scaled value, $k_1 i(t)$, instead of $i(t)$. Thus, the received equation on the jth antenna is given by, $$y_1(t)=i(t)+\Sigma h^k{}_1 s_k(t)$$

$$y_j(t)=h_j i(t)+\Sigma h^k{}_j s_k(t), \forall j \neq 1$$

Now, since the channel of the interferer is given by $(1, h_1, \ldots, h_M)$, it is sufficient to find the $h_j$s. To do this, the receiver correlates all the equations above with $y_1(t)^*$ and taking the expectation.

$$E[y_1(t)y_1(t)^*]=P_i+\Sigma h^k{}_1 h^{k*}{}_1 P_k$$

$$E[y_j(t)y_1(t)^*]=h_j P_i+\Sigma h^k{}_j h^{k*}{}_1 P_k,$$

where P's are the corresponding powers. Since the only unknowns in the above equations are $P_i$ and $h_j$'s, they can be easily computed. Thus, even in the presence of K concurrent transmissions, a 802.11 receiver can estimate the channel of the interferer without knowing the preamble.

A prototype of an embodiment of the approach described above has been built using the USRP2 radio platform and the GNURadio software package. A 2×2 MIMO system is built using two USRP2 radio-boards connected via an external clock. Each USRP2 is configured to span a 10 MHz channel by setting both the interpolation rate and decimation rate to 10. The resulting MIMO node runs a PHY layer similar to that of 802.11n, i.e., it has 64 OFDM subcarriers, a modulation choice of BPSK, 4 QAM, 16 QAM, or 64 QAM, and punctured convolution codes with standard 802.11 code rates. Since half the 802.11 bandwidth is utilized, the possible bit rates span 3 to 27 Mbps.

The receiver MIMO decoding algorithm is modified to incorporate the systems described herein. Interference nulling is also implemented at the MIMO transmitters. To work with cross-technology interference, the transmitter first computes the channel ratios and then uses them for nulling.

Systems that implement the techniques described above can be implemented in software, in firmware, in digital electronic circuitry, or in computer hardware, or in combinations of these. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system (e.g., a software programmable access point) including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

It is to be understood that the foregoing description is intended to illustrate and not to limit the scope of the invention, which is defined by the scope of the appended claims Other embodiments are within the scope of the following claims.

What is claimed is:

1. A method for mitigating an effect of an interfering radio signal at a multiple antenna receiver, the method comprising:
    forming an estimate of a relationship of the interfering signal among signals received from the multiple antennas, forming the estimate of the relationship of the interfering signal among signals received from the multiple antennas including forming an estimate of a plurality of interferer channel ratios each representing a ratio of a first channel characteristic between a source of the interfering signal and a first antenna of the multiple antennas to a second channel characteristic between the source of the interfering signal and a second antenna of the multiple antennas at one of a plurality of signal frequencies;
    filtering and combining the signals received from the multiple antennas according to the estimate of the relationship of the interfering channels to reduce an effect of the interfering signal;
    decoding desired data present in a desired signal represented in the filtered and combined signals; and
    updating the estimate of the relationship of the interfering signals according to the decoding of the desired signal.

2. The method of claim 1 wherein forming the estimate of the relationship of the interfering signal includes forming an estimate of a time domain filter.

3. The method of claim 2 wherein forming the estimate of the time domain filter comprises forming an estimate of the filter at each of a plurality of transmission frequencies, and forming the time domain filter according to the estimates at said frequencies.

4. The method of claim 3 wherein the desired signal comprises an orthogonal frequency division multiplexed (OFDM) signal, and the transmission frequencies comprise frequencies of the OFDM signal.

5. The method of claim 3 wherein forming the estimate at each of the transmission frequencies comprises using channel estimates from a transmitter of the desired signal to the receiver.

6. The method of claim 1 wherein forming the relationship of the interfering signals comprises using a relationship of the desired signal among the signals received from the multiple antennas.

7. The method of claim 6 wherein the relationship of the desired signal comprises channel estimates from a transmitter of the desired signal to the antennas of the receiver.

8. The method of claim 1 wherein the receiver comprises a two-antenna receiver, and filtering and combining the signals comprises time domain filtering a signal received from one of antennas of the receiver and forming a difference of the filtered signal and a signal received from the other of the two antennas of the receiver.

9. The method of claim 1 wherein decoding the desired data comprises error correcting the desired data and updating the estimate of the relationship of the interfering signals comprises using the decoded signal and a relationship of the desired signal among the signals received from the multiple antennas.

10. The method of claim 1 comprises storing the signals received from the multiple antennas, and the method comprises iterating:
    decoding the desired data, including error correcting the desired data;
    updating the estimate of the relationship of the interfering signals using the error corrected data and a relationship of the desired signal among the signals received from the multiple antennas; and
    filtering and combining the stored signals received from the multiple antennas.

11. The method of claim 1 wherein said relationship comprises a quantity characterizing at least one of a relative magnitude and a phase difference between the interfering signal received at said multiple antennas.

12. The method of claim 1 wherein said relationship comprises a quantity characterizing a relationship of signal characteristics among components of the interfering signal at different antennas of the multiple antennas.

13. A method for receiving a desired signal in the presence of an unknown interfering signal, the method comprising:
    receiving a first signal at a first antenna, the first signal including a first linear combination of the desired signal and the unknown interfering signal;
    receiving a second signal at a second antenna, the second signal including a second linear combination of the desired signal and the unknown interfering signal;
    generating an initial estimate of a plurality of interferer channel ratios each representing a ratio of a first channel characteristic between a source of the interfering signal and the first antenna to a second channel characteristic between the source of the interfering signal and the second antenna at one of a plurality of signal frequencies;
    iteratively determining the desired signal from the first signal and the second signal including;

generating a time domain filter from the interferer channel ratios;

filtering the second signal using the time domain filter, generating a filtered second signal;

subtracting the filtered second signal from the first signal, yielding an estimate of the desired signal;

decoding the estimate of the desired signal;

updating the interferer channel ratios using the decoded estimate of the desired signal.

14. A non-transitory computer-readable medium comprising software stored thereon the software comprising instructions for causing a data processing system to:

form an estimate of a relationship of the interfering signal among signals received from multiple antennas, forming the estimate of the relationship of the interfering signal among signals received from the multiple antennas including forming an estimate of a plurality of interferer channel ratios each representing a ratio of a first channel characteristic between a source of the interfering signal and a first antenna of the multiple antennas to a second channel characteristic between the source of the interfering signal and a second antenna of the multiple antennas at one of a plurality of signal frequencies;

filter and combine the signals received from the multiple antennas according to the estimate of the relationship of the interfering channels to reduce an effect of the interfering signal;

decode desired data present in a desired signal represented in the filtered and combined signals; and update the estimate of the relationship of the interfering signals according to the decoding of the desired signal.

15. The non-transitory computer-readable medium of claim 14 wherein the instructions for causing the data processing system to form the estimate of the relationship of the interfering signal include instructions for causing a data processing system to form an estimate of a time domain filter.

16. The non-transitory computer-readable medium of claim 15 wherein the instructions for causing the data processing system to form the estimate of the time domain filter comprise instructions for causing the data processing system to form an estimate of the filter at each of a plurality of transmission frequencies, and instructions for causing the data processing system to form the time domain filter according to the estimates at said frequencies.

17. The non-transitory computer-readable medium of claim 16 wherein the desired signal comprises an orthogonal frequency division multiplexed (OFDM) signal, and the transmission frequencies comprise frequencies of the OFDM signal.

18. The non-transitory computer-readable medium of claim 16 wherein the instructions for causing the data processing system to form the estimate at each of the transmission frequencies comprise instructions for causing the data processing system to use channel estimates from a transmitter of the desired signal to the receiver.

19. The non-transitory computer-readable medium of claim 14 wherein the instructions for causing the data processing system to form the relationship of the interfering signals comprise instructions for causing the data processing system to use a relationship of the desired signal among the signals received from the multiple antennas.

20. The non-transitory computer-readable medium of claim 19 wherein the relationship of the desired signal comprises channel estimates from a transmitter of the desired signal to the antennas of the receiver.

21. The non-transitory computer-readable medium of claim 14 wherein the receiver comprises a two-antenna receiver, and the instructions for causing the data processing system to filter and combine the signals comprise instructions for causing the data processing system to time domain filter a signal received from one of antennas of the receiver and form a difference of the filtered signal and a signal received from the other of the two antennas of the receiver.

22. The non-transitory computer-readable medium of claim 14 wherein the instructions for causing the data processing system to decode the desired data comprise instructions for causing the data processing system to error correct the desired data and the instructions for causing the data processing system to update the estimate of the relationship of the interfering signals comprise instructions for causing the data processing system to use the decoded signal and a relationship of the desired signal among the signals received from the multiple antennas.

23. The non-transitory computer-readable medium of claim 14 further comprising instructions for causing the data processing system to store the signals received from the multiple antennas, and instructions for causing the data processing system to iteratively: decode the desired data, including error correcting the desired data; update the estimate of the relationship of the interfering signals using the error corrected data and a relationship of the desired signal among the signals received from the multiple antennas; and filter and combine the stored signals received from the multiple antennas.

* * * * *